T. H. WALBRIDGE.
WHEEL.
APPLICATION FILED SEPT. 9, 1907.
945,824.
Patented Jan. 11, 1910.
2 SHEETS—SHEET 1.
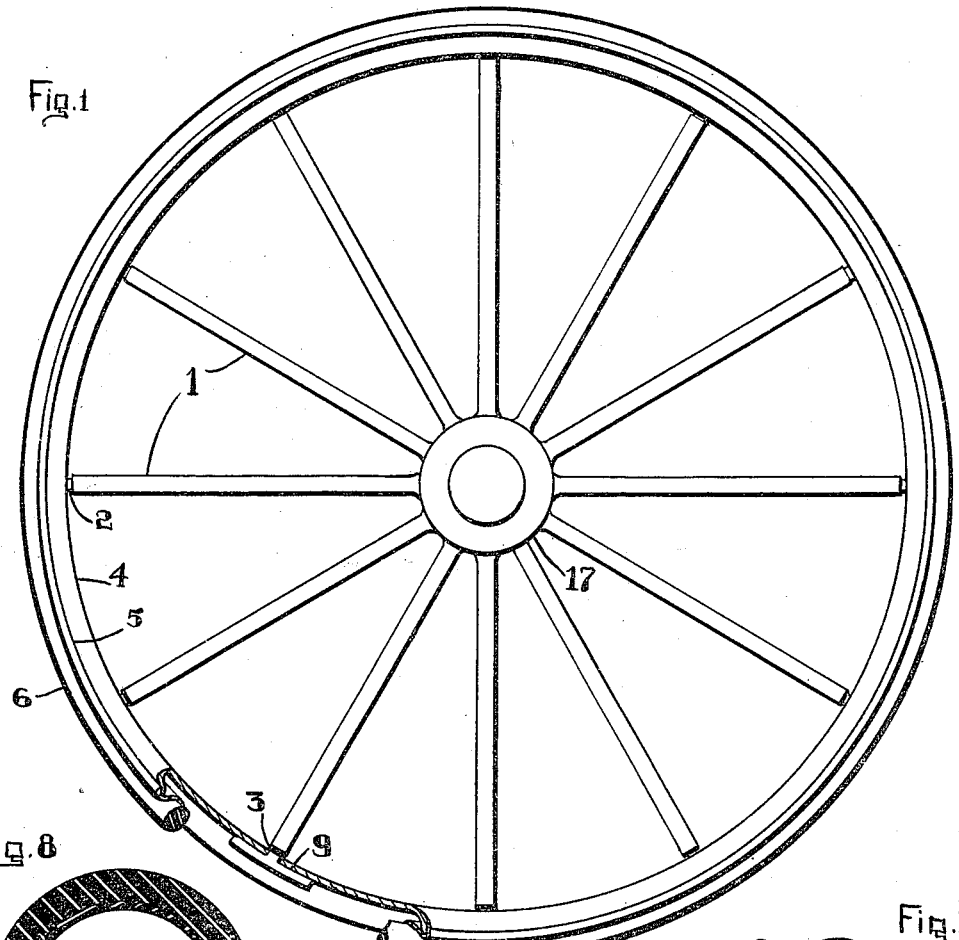
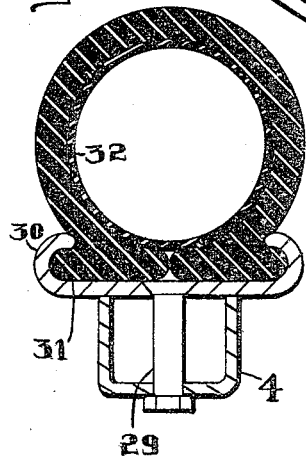
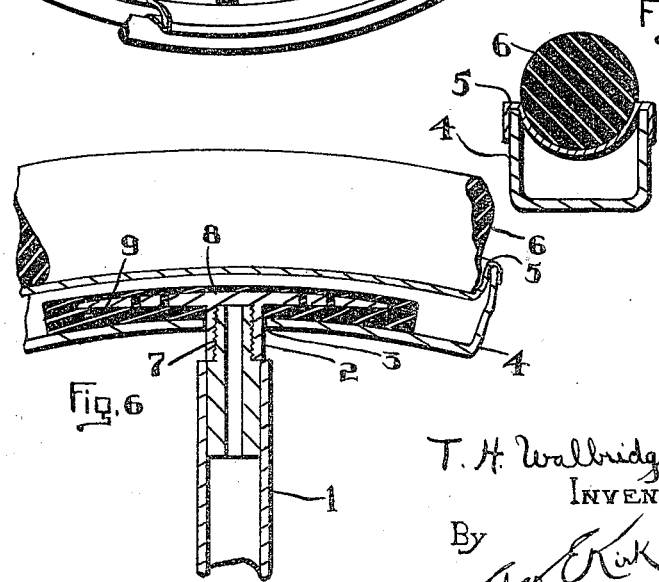
Witnesses
Hazel Kirk
M E Kirk
T. H. Walbridge
Inventor
By
Geo E Kirk
Attorney T. H. WALBRIDGE.
WHEEL.
APPLICATION FILED SEPT. 9, 1907.
945,824.
Patented Jan. 11, 1910.
2 SHEETS—SHEET 2.
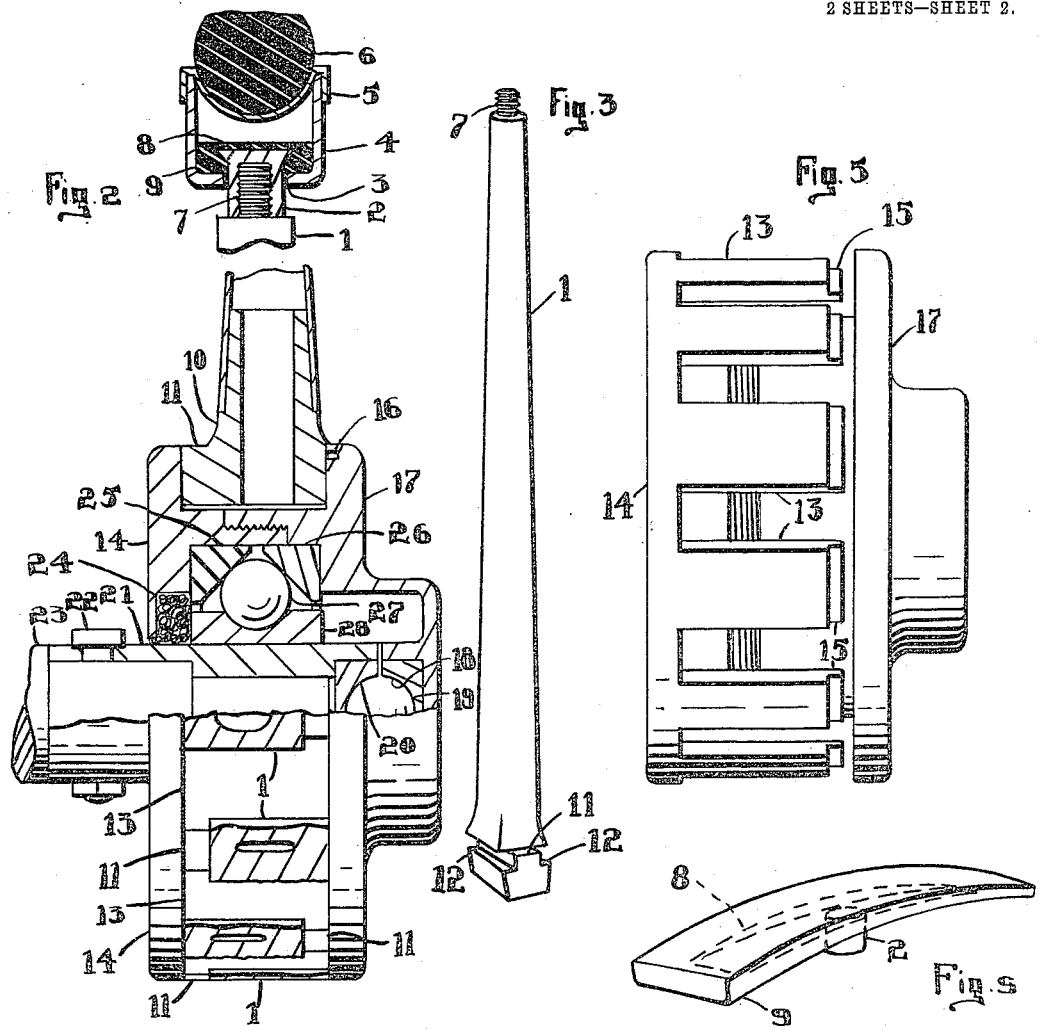
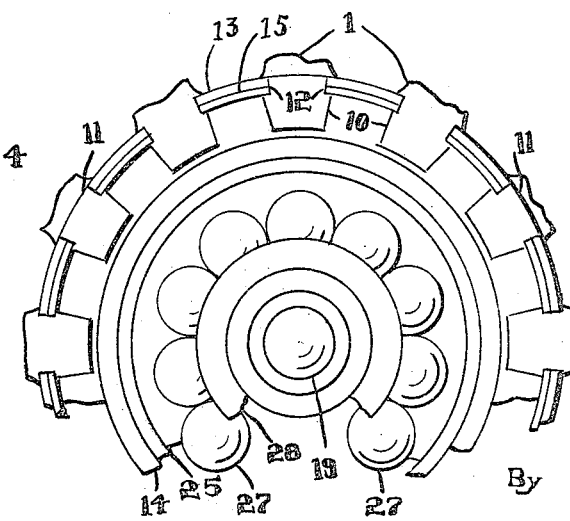

UNITED STATES PATENT OFFICE.

THOMAS H. WALBRIDGE, OF TOLEDO, OHIO.

WHEEL.

945,824.

Specification of Letters Patent.

Patented Jan. 11, 1910.

Application filed September 9, 1907. Serial No. 391,875.

*To all whom it may concern:*

Be it known that I, THOMAS H. WALBRIDGE, a citizen of the United States, residing at Toledo, Lucas county, Ohio, have invented a new and useful Wheel, of which the following is a specification.

This invention relates to the manner of disposing a wheel on its support, and more particularly to the positive and true centering of the tread as to the hub, and the positive and true centering of the wheel as to its support; also to the production of a weatherproof structure having "life".

This invention has utility when adapted to that form of wheels having spokes, in the mounting of the spokes, to centering of wheels with short hubs, to metallic wheels which may be given a pleasing symmetrical appearance while they are most substantial and permanent owing to rigid hub construction and provision whereby shocks, expansions and contractions are not acting to strain and destroy the device. Wheels for heavy trucking, for motor cars and for light carriages, may be so designed in accordance with this invention as to produce most satisfactory results.

Referring to the drawings: Figure 1 is an elevation, with parts broken away, showing an embodiment of the invention in a vehicle wheel; Fig. 2 is a fragmentary view showing a portion of a hub and felly with the tire in section; Fig. 3 is a perspective view of a spoke; Fig. 4 is a fragmentary view looking into the hub, the outer or cap member being removed; Fig. 5 is a detail view of interlocking annular hub members partially disengaged from each other; Fig. 6 is a sectional view of a mounting of a spoke in a felly; Fig. 7 is a cross section of a felly showing seating of a tire; Fig. 8 is a cross section of a similar felly adapted to a pneumatic tire; and Fig. 9 is a perspective view of a yieldable seat or mounting for the outer or felly end of the spokes.

The wheel as shown comprises a plurality of radiating spokes 1. The portion of each spoke remote from the hub has connection with an element 2 extending inward through opening 3 in felly 4. Should it be desired to adapt the wheel to a solid rubber tire, this is conveniently done by providing reversely channeled member 5 which, while spacing the side flanges of U-shaped felly 4, provides a holding means for tire 6.

The spoke 1 as shown herein is metal, tubular, and at its outer end has fitted therein a reinforcement with a threaded extension 7 with which the element 2 engages. Element 2 has an enlargement 8, between which and the felly 4 is interposed yieldable means 9 constituting a mounting or seat for spoke 1.

The inner end of spoke 1 has hollow reinforcement 10 with a lateral extension or offset 11. Reinforcement 10 of the spoke 1 has channels or undercut portions 12 extending longitudinally of the wheel into which fit the flush tongues or spacing fingers 13 of the annular hub member 14. The free ends of these spacing means 13 are reduced to extensions 15 which may engage in annular groove 16 of annular cap member 17 of the hub.

Concentrically disposed in hub member 17 is recess 18 opening parallel to the plane of the wheel. Seated in this recess is ball 19 which also fits in opposing recess 20 of support 21 held by means 22 on axle 23. The ball 19 movable relatively to recesses 18, 20, is a rotatable means permitting accurate centering of the wheel on its support and maintaining the assembled structure in such true position, thereby opening a field for the successful use of short hub bearings and resulting cheaper construction.

For the retention of lubricant and exclusion of foreign matter, packing 24 surrounds the single joint where there is exposed relative rotation of parts.

The bearing is shown as of anti-friction type, comprising cone 25 seated in hub member 14, cone 26 seated in hub member 17, a series of balls 27, and bearing ring or cup 28 on support 21. In this embodiment, the wheel and bearing may be assembled as a unit, thus being adapted for attachment to various kinds of vehicles.

For special forms of tires, the wheel is susceptible to modification, as for instance to a clencher pneumatic tire, when by means of bolts 29 (Fig. 8), channel 30 may be attached to felly 4 to hold the clencher casing 31 surrounding inner pneumatic tube 32.

In seeking to design a metal wheel stiff enough to withstand the wear and tear to which it is ordinarily subjected when used on vehicles in road work, the tendency is to make the wheel so rigid that stresses set up internally by contraction and expansion from temperature changes, or strains due to violent external shocks, are not modified nor equitably distributed, so such a metal wheel early works its own destruction. Variously forming the elements of the metal wheel to avoid this trouble leads toward unpopular or freakish appearance as well as introduces weaknesses of practical construction.

Metal has the strength, and properly disposed, may have the durability. In a device with metal joints working on metal, exposed to weather, deterioration soon sets in. Without the metal joints, the strong and rigid wheel elements are self destroying. Imparting "life" to the wheel by permitting "give" within the structure and still producing a sightly and weatherproof device is attained in this invention. To bring out this imparting of "life" to the structure, the term yielding or yieldable is used and is intended to define this vibration absorbing property of the disclosure.

The hub is a weatherproof shell. The spokes, though staggered to give lateral stability and maintain the wheel true, are uniform and interlock with fingers 13 of hub member 14, which fingers through their extensions 15 interlock with hub member 17. The spokes, seated and packed by rubber cushion 9 at their outer ends, have a tight joint to exclude foreign matter, although slight reciprocation of the spoke relative to the felly is permitted to accommodate internal stresses and external shocks producing a flexibility analogous to that of wooden wheels. These spokes thus held are interlocked and spaced by tongues 13. By rotation of member 17 to screw the hub members together, the spokes are rigidly locked at their inner portions and a tight weatherproof hub shell is thus produced. The staggering of the spokes throws the felly medially of the hub as shown in Fig. 2. In assembling, the spokes are brought against the cushioning or yieldable seating means 9. Accordingly in operation when an object is encountered giving the wheel a shock, the nearer spokes permit some inward movement of the felly, the total of spokes maintaining the felly in a circular form, while the remote spokes are yieldably placed under tension to carry the load, thereby resulting in a suspension wheel.

By the use of this invention a strong stiff wheel may be produced, laterally stiff as to its support. When the material of construction adopted is metal, foreign matter is effectively excluded from working in to weaken the wheel elements, for at the hub there is a regular surface provided by the shell members 14, 17, which so hold the spokes that there can be no movement to open up passages to let in moisture and grit with resulting corrosion and destruction of the wheel elements. Like precaution is taken in spoke mounting at each end thereof, for at the outer end, while there is here a joint permitting slight movement and giving "life" to the wheel, this joint is so packed by the yielding means 9 that it is weatherproof. The spokes normally hold the felly member 4 concentric to the wheel hub. The lateral stiffening of the wheel is accomplished by centering means 19 and by reversely arranging the offsets 11 of adjacent spokes so that there is such pull by alternate spokes on their yieldable seats 9 as to medially hold the felly 4.

What is claimed and it is desired to secure by Letters Patent is:

1. In a wheel, the combination with a hub, and spokes radially set therein, of a felly surrounding the outer ends of said spokes, said felly being trough-shaped in cross-section, a detachable head secured to the outer end of each spoke, said head comprising a plate having a projecting socket portion into which the end of the spoke is set, and a cushion of elastic material resting in the trough-shaped felly, and in which the said detachable head is permanently embedded, whereby the spoke is yieldingly held in said felly, and is capable of a slight radial movement relative thereto in either direction.

2. In a wheel, the combination with a hub, and spokes rigidly set therein, of a channel-shaped felly to which the outer ends of said spokes are resiliently connected, such connection comprising a detachable head secured to the end of each spoke, said head having an enlargement extending peripherally of said felly, and an elastic cushion surrounding said enlargement, and lying within said channel-shaped felly, whereby a large bearing surface for supporting the spoke is provided.

3. In combination, a wheel having a hub comprising a pair of annular members between which the spokes are held, a cone ring carried inside each member and arranged to form one side of a raceway lying substantially in the plane of the wheel, an axle carrying an annular member forming the other side of said raceway, balls in said raceway forming the load supporting bearing for said wheel, and a centering device comprising concentrically disposed sockets formed in the end of the axle and in one of said annular hub members respectively, and a ball fitting said sockets, and serving to maintain the parts in alinement.

4. In combination, a wheel having a hub comprising a pair of annular members between which the spokes are held, a bearing surface carried inside each member, an axle carrying an opposed bearing surface, antifriction devices disposed between said opposed surfaces and coöperating therewith to form a load supporting bearing for said wheel, and a centering device independent of said load supporting bearing, serving to maintain the parts in proper position.

In testimony whereof I affix my signature in the presence of two witnesses.

THOMAS H. WALBRIDGE.

Witnesses:
 GEO. E. KIRK,
 FRANK M. ROGERS.